United States Patent [19]

Farnam

[11] 4,070,219
[45] * Jan. 24, 1978

[54] METHOD OF MAKING DENSIFIED CONVOLUTE GASKET STRUCTURE

[75] Inventor: Robert G. Farnam, New Lisbon, Wis.

[73] Assignee: F. D. Farnam Co., Lyons, Ill.

[*] Notice: The portion of the term of this patent subsequent to Oct. 10, 1989, has been disclaimed.

[21] Appl. No.: 651,703

[22] Filed: Jan. 23, 1976

Related U.S. Application Data

[60] Continuation of Ser. No. 496,766, Aug. 12, 1974, abandoned, Division of Ser. No. 301,435, Oct. 27, 1972, Pat. No. 3,854,736, said Ser. No. 496,766, Continuation-in-part of Ser. No. 250,193, is a continuation-in-part of Ser. No. 840,171, July 9, 1969, Pat. No. 3,697,348.

[51] Int. Cl.$^2$ ............................................. B32B 5/14
[52] U.S. Cl. ......................................... 156/192; 156/193; 156/194; 156/219; 156/250; 156/320; 427/385 B; 427/385 C
[58] Field of Search ............... 156/191, 192, 193, 194, 156/211, 245, 219, 250, 320; 277/204, 211, 227, 235 R, 235 B; 427/385

[56] References Cited

U.S. PATENT DOCUMENTS

| | | | |
|---|---|---|---|
| 2,255,504 | 9/1941 | Current | 156/194 |
| 2,676,823 | 4/1954 | Olson et al. | 277/227 |
| 3,267,968 | 8/1966 | Foll et al. | 156/192 |
| 3,697,348 | 10/1972 | Farnam | 156/190 |
| 3,837,657 | 9/1974 | Farnam et al. | 277/211 |
| 3,890,183 | 6/1975 | Farnam | 156/193 |

Primary Examiner—Charles E. Van Horn
Assistant Examiner—Basil J. Lewris
Attorney, Agent, or Firm—Robert C. Brown, Jr.

[57] ABSTRACT

The method of making a gasket structure for sealing mating parts together in which the body portion of the gasket structure is formed by convolutely wound annular alternate discrete layers of a carrier material and a fluid impermeable polymeric material adhered thereto of substantially uniform thickness from layer to layer, and cured, and characterized by having the body portion of the gasket structure, throughout substantially its entire extent, compacted to a substantially uniform density. The gasket structure may be formed with a bead of relatively low density, as compared to the body portion, on at least one surface thereof to compensate for surface contour variations, and a coating layer may be provided covering the gasket structure, which is cured after application and which is characterized by its impermeability to, and resistance to, the fluids which are to be sealed off, and to minimize the clamping forces required for compaction to completely seal the mating parts.

11 Claims, 7 Drawing Figures

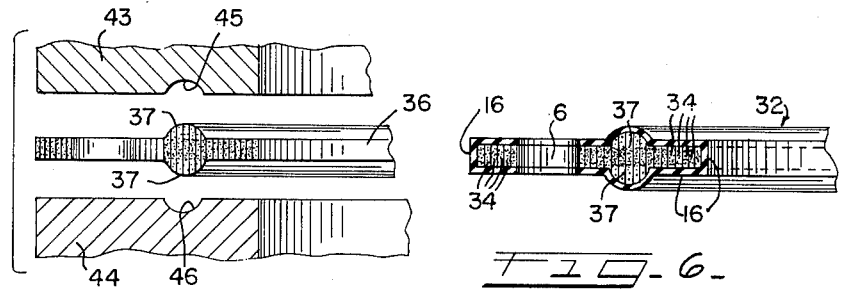
FIG. 4.
FIG. 6.
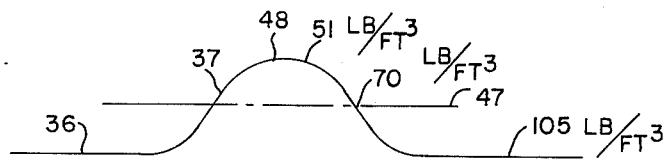
FIG. 5.
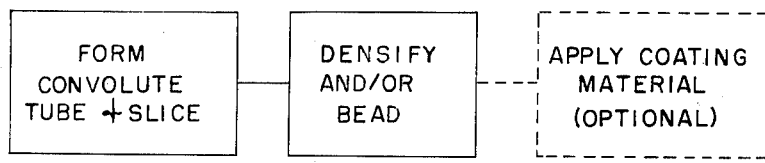
FIG. 7.

METHOD OF MAKING DENSIFIED CONVOLUTE GASKET STRUCTURE

This application is a continuation of application Ser. No. 496,766, filed Aug. 12, 1974, now abandoned, which is a division of application Ser. No. 301,435, filed Oct. 27, 1972, now U.S. Pat. No. 3,854,736, granted Dec. 17, 1974; said application Ser. No. 496,766 is also a continuation-in-part of my application Ser. No. 250,193, filed May 4, 1972, now U.S. Pat. No. 3,890,183, granted June 17, 1975, which is a continuation-in-part of my application Ser. No. 840,171, filed July 9, 1969, now U.S. Pat. No. 3,697,348, granted Oct. 10, 1972.

BACKGROUND OF THE INVENTION

There are various ways to make gaskets, and economics play a big part in determining which mode of fabrication is most suitable for a given end product. A large share of gaskets manufactured are made from sheet packing, being die-cut to appropriate shape, and then additionally processed to meet specific requirements. For example, as shown in Farnam U.S. Pat. No. 3,661,401, the packing material was selected for all of the requisite physical properties needed except for sealability, and then the gasket was encapsulated or coated with a suitable coating material to provide that property.

Again, in Farnam et al. U.S. Pat. No. 3,655,210, a special gasket structure comprising a core having special heat insulating bushings at the bolt holes, and covered on both sides with packing material, was compressed to provide an upstanding bead in the packing material for desired sealability.

Molded rubber gaskets, with or without sealing beads, are well known in the art.

Convolutely wound gaskets have had a limited application because it has been generally assumed that once the gasket is cut from the convolute tube from which is was made, it was a completed gasket except for possible post-curing.

The present invention provides a new horizon for convolute gaskets by teaching the manner in which they may be wound with appropriate materials and under appropriate conditions to form a basic gasket structure and shape, after which they are processed through the application of lateral pressure to provide the desification required for torque retention, and simultaneously with the desification a bead of lesser density may be formed, and optionally the gasket structure thus fabricated may then be coated on the top and bottom faces or completely encapsulated to provide desired sealing quality.

The prior art discloses conventional gaskets that are provided with sealing beads but which are of the same density and compressibility as the unbeaded portions of the gaskets. All of these prior gaskets are of limited use because of specific functional properties. Some jointing requirements are adequately met by providing a gasket with a molded bead on one or both sides of the gasket to create a more comformable seal than could be created with the same material unbeaded, and these gaskets were usually made from solid elastomeric materials. This type of gasket structure offered relatively poor torque retention, while distortion of the mating surfaces was substantially uncontrolled and the physical properties were quite restricted because of the limited materials that could be formed into this type of gasket structure.

The prior art also includes some instances where gaskets and like articles have been formed by making rubber tubes by winding rubber stock on a mandrel or by extruding such stock in the form of a tube and thereafter curing the formed rubber tube after which gaskets are cut from the tube. One facet of the present invention, however, includes an improvement for controlling the thickness of the wound tube as reflected in the final gasket product and the novel convolute beaded disclosed herein incorporates this improvement.

A need exists for a beaded gasket structure that can be manufactured economically to fit the numerous applications that are subject to substantial distortion under clamping loads and which require high torque retention directly under and between the clamping bolts, since the gasketing of clamped faces is usually an economic compromise that is answered by the provision of a joint that can be sealed and then opened and re-sealed many times at the lowest possible cost which embraces the structure and shape of the clamping faces, the number, size and type of fasteners, the quality of flange smoothness and flatness, as well as other factors.

SUMMARY OF THE INVENTION

This invention pertains to gasket materials and gasket structures which are compactible, and conform when compressed, and distinguished from other materials which comprise solids, some of which may flow to some extent under compression, but which do not compress. The materials and gasket structures of this invention are characterized by having small voids therein whereby the density of the material may be increased selectively under appropriate pressure conditions, by compaction. The entire body portion of this convolute beaded gasket is pre-compressed or compacted and, at the same time, an integral bead may be formed on one or both sides of the gasket structure with the bead being of less density than the body portion of the gasket structure after compaction. This densified convolute gasket structure is economical to manufacture and has the ability effectively to seal flanges which are otherwise subject to distortion that causes variable clamping loads over the face of the gasket while providing high torque retention of the clamping bolts with minimal distortion of the mating flanges.

The invention relates to a convolute gasket structure which combines the several structural features in a new and novel concept for an industrial type gasket useful in many fields and incorporating improvements affording advantages not found in any gasket heretofore and which represent a very significant advance in this art. The invention starts with the concept of a gasket structure having a body portion of convolute laminated construction cut from a laminate tube formed by winding a web of gasket material in selected lengths on a core having a cross sectional configuration conforming to that desired for the finished gasket. Gasket blanks are cut from the laminate tube to preselected thickness according to intended use of the finished gaskets. The body portion of the gasket blank is laterally compacted to provide a pre-compressed structure of increased density and if desired, a bead if formed on a face of the gasket which may occur on one or both sides of the gasket structure. The bead when used, is formed simultaneously with the densification of the gasket structure and is of less density than the compacted body portion of the gasket and while remaining free of compression is formed as an integral part of the gasket structure. However, it is contemplated that a separately formed bead of the desired density may be applied to the densified body portion. The densified convolute gasket structure, may then be provided with a coating layer which renders the gasket impermeable by fluids that the gasket is intended to be used with. This coating layer, being substantially impermeable, makes possible the use of a gasket body with suitable conformability, compression and torque retention properties derived from the amount and type of fibers and type of elastomeric material used as binder for such fibers, so that the coating material, when the gasket structure is clamped in place, provides the necessary dam for sealing purposes without necessarily completely closing the voids in the gasket structure. Furthermore, the coating material, in itself, is highly conformable and conforms readily to surface imperfections in the clamping faces to thereby enhance the seal across the clamping faces.

For a description of a suitable convolute gasket construction and the method of manufacturing a gasket of this type, reference is had to, my U.S. Pat. No. 3,697,348 of Oct. 10, 1972, the disclosure of which is pertinent hereto, and which is hereby incorporated herein by this reference.

Also incorporated by reference is the disclosure of copending application for patent Ser. No. 278,259, filed Aug. 7, 1972, which is a continuation-in-part of abandoned application Ser. No. 211,003, filed Dec. 22, 1971, for Beaded Gasket and Method of Using Same showing how a gasket for automotive application may be precompressed to provide a gasket structure having a relatively highly densified body portion and a beaded portion relatively free of any densification.

For a description of a suitable coating material and an automotive type gasket having a coating layer applied thereto, reference is made to U.S. Pat. No. 3,661,401 of May 9, 1972, the disclosure of which is pertinent hereto, and which therefore is hereby incorporated herein by this reference.

DESCRIPTION OF THE DRAWINGS

FIG. 4 is a diagrammatic sectional view taken on the line 4—4 of FIG. 1 showing the manner in which a bead of lesser density may be formed during precompression of the gasket structure;

FIG. 5 is a diagrammatic view which illustrates by way of example, how a given gasket utilizing a bead is made more dense in the precompression step throughout the body portion of the gasket while the bead is made less dense during this same step;

FIG. 6 is a sectional view through the gasket structure similar to the section of FIG. 4 but showing an optional outer sealing layer coating the surfaces of the gasket; and FIG. 7 is a block diagram illustrating the method steps of forming the convolute tube, slicing the gasket, densifying the gasket body portion and forming a bead and the optional step of applying a layer of coating material on the surfaces of the gasket.

DESCRIPTION OF PREFERRED EMBODIMENT

Figure 3:
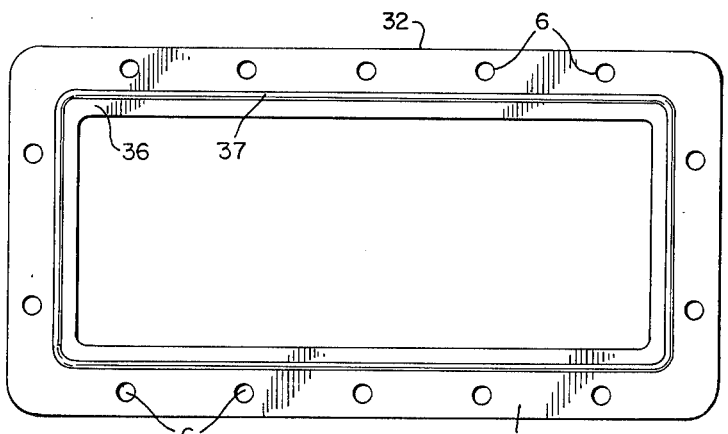
FIG. 3 is plan view showing a pan type gasket formed from the convolutely wound gasket material.

Generally, the method steps utilized in forming the gasket of this invention are diagrammatically illustrated in FIG. 7 and comprise the provision for forming of a gasket tube 30 by convolutely winding a web of gasket material 4 on a mandrel 124 of the desired shape according to the final internal configuration necessitated by the gasket 32 to be manufactured. Gasket blanks 24 are sliced from this convolute tube and then are laterally densified to provide a gasket body portion that is compacted to a substantially greater extent than the undensified gasket structure prior to this step. An integral bead 37 may be formed on one or both faces of the gasket structure at the same time that the body portion of the gasket structure is compacted and these beads are of less density than the densified body portion and preferably of less density than the density of the gasket structure prior to compaction. The thus formed lower density bead, or beads, assured good sealing properties of the finished gasket and permit high torque retention of the bolts clamping the gasket between opposed surfaces with minimal distortion of the mating surfaces. An optional coating may be applied to the densified gasket structure, whether it is beaded or unbeaded, which is dried and cured after application. This coating is of less density than the compacted gasket body portion and consequently correspondingly greater conformability thereof than the densified gasket body portion in afforded and hence provided better surface sealability which serves to minimize clamping forces required for compaction of the gasket 32 to completely seal the opposed surfaces between the mating parts. The finished gasket 32 is illustrated in FIG. 3 where a bead 37 is shown extending continuously around the central aperture and having the bolt holes disposed on all sides outwardly of the bead.

Figure 1:
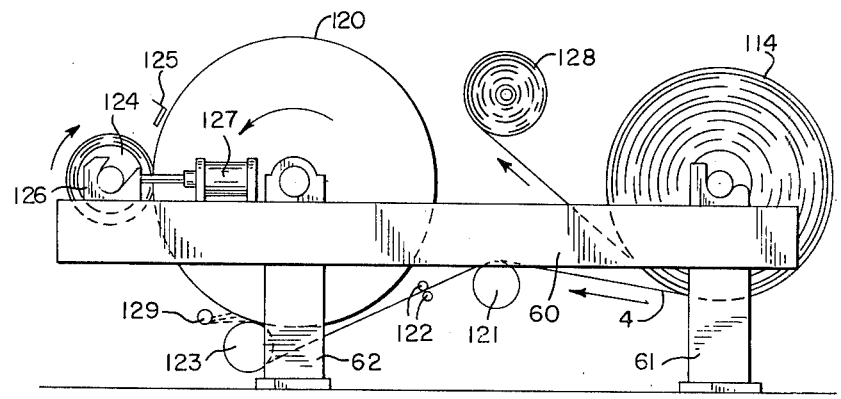
FIG. 1 is a schematic illustration of a tube winding apparatus for forming a convolutely wound tube from which individual gaskets may be sliced.
Figure 2:
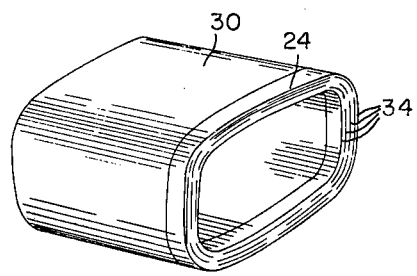
FIG. 2 is a perspective view of the convolutely wound tube indicating the thickness of one gasket sliced therefrom.

FIG. 1 illustrates an apparatus for forming the tube from which individual gasket blanks are sliced comprising a type of tube winder that forms the tube from a precoated and dried web of gasket material. The coated web of material 4 unwinds from the coated roll of stock 114. The stock roll, as well as a variable speed heated drum 120, is mounted for rotation and supported in a frame structure 60, 61 and 62. The coated web 4, as it leaves the roll 114, passes over a roller 121, through a pair of measuring rolls 122, and then around a roller 123 to reverse its direction before passing around the heated drum roller 120. The web 4 travels around a substantial portion of the heated drum where its coatings are softened and then is wrapped onto a mandrel 124, which may be of the desired contour to provide the final shape to the gasket blank to be sliced therefrom. The measuring rolls 122 determine the length of the web material to be utilized for a particular size tube to be wound onto the mandrel to obtain the gasket blank size desired. A web clamp and cut-off bar 125 is provided for the web material just ahead of the point where the web approaches the mandrel 124. This enables the web 4 to be squared off and placed during the start up of the winder mandrel to form the gasket tube. The mandrel is rotatively mounted in sliding blocks 126, supported on the frame structure and these sliding blocks are connected with air cylinders 127, which apply the pressure necessary initially to tack the first web, and then hold the pressure at the ribs between the wrapped tube and the drum 120 during the tube forming operation. After the wrapped tube has been formed on the mandrel 124, the unit is stopped, the web 4 is cut by means of the bar 125, and then advanced with the drum 120, which comprises the driver roll. The pressure is released and the wrapped gasket tube is removed. The wrapped gasket tube, removed from the mandrel, is illustrated in FIG. 2. The tension on web 4 is released and air jet 129 cools the web. The mandrels 124 upon which these gasket tubes are formed, are contemplated as comprising plain steel tubes, of the desired shape, that slide over an expanding type shaft. An inventory of such mandrels is maintained sufficient to keep pace with the gasket tube winding operations, since this is performed very rapidly and is completed at a relatively fast rate. These same steel mandrels, wrapped with the sheet packing, may be utilized in the subsequent curing operation.

Where a slip sheet is utilized in the wound roll of coated stock 114, the slip sheet is removed from the stock roll simultaneously with the unwinding of the web 4 from the roll 114, and the slip sheet is wound onto a roll 128 automatically as it is removed from between the rolls of the stock material coming off the roll 114. Where the coating material on the web 4 is such as to create problems of sticking when wound into the roll 114, the thin waxed paper slip sheet is used as a separator between the rolls of the coated web. The thin waxed paper slip sheet thus is provided primarily to prevent the coated web material 4 from sticking to itself when wound into the roll form. An optional feature of the invention contemplates placement of the coated web material, used to form the laminated gasket tube, on a bias to obtain a spirally wound gasket tube in the final product.

As shown in FIG. 2, it will be seen that the wound tube coming off the mandrel and comprising the gasket core, is somewhat oblong in cross section to produce an oblong multi-layered gasket tube 30 which corresponds to the final configuration of the interior surface of the gasket to be formed. The gasket 32, as best shown in FIGS. 4 and 6, comprises multiple plies of gasket material 34. Material made from granulated cork bonded with glue or resin, granulated cork mixed with various elastomers, asbestos paper, asbestos millboard, and various elastomers such as chloroprene, nitrile, natural rubber or GR-S(styrene butadiene rubber), reinforced with organic or inorganic fibers such as asbestos or vegetable fibers, are useful in forming the gasket. Material such as KAOPAK, KAOKORK and KAOBESTOS are made in web or sheet form and all have a grain resulting from the fact that a greater percentage of the fibers lie parallel to the length of the sheet, as manufactured, rather than parallel to the width of the sheet. The difference is in the range of 2:1, which is reflected in the tensile strength since this is normally higher parallel to the grain than it is across the grain. This characteristic contributes an important advantage to gaskets cut from tubes thus formed since a significant number of the fibers are disposed substantially at right angles to the lines of clamping when the gasket is clamped between opposing surfaces in use to provide additional torque retention to the clamped gasket in service. This condition may vary from one material to another but it is important that the gasket 32 not only must seal, but must maintain its sealing properties by virtue of its structure and its stress relaxation properties which are referred to as "torque retention".

The gasket 32, as manufactured for use, may be provided with a bead 37 on one or both top and bottom surfaces, which is adapted to be engaged by one or both opposing faces of the clamping surfaces between which the gasket is disposed and normally retained by through bolts passing through the bolt holes 6 to maintain a fluid tight relationship. The gasket material is compactible and compressible and the gasket thickness bead depth relationship can be coordinated so as to compact the beaded gasket in a manner whereby it completely seals the opposing clamping surfaces and maintains thin sealing relationship.

In fabricating a beaded gasket 32 a gasket blank is sliced from the gasket tube 30, as indicated in FIG. 2, and placed between suitable ground steel blocks 43 and 44, as shown in FIG. 4, which have grooves 45 and 46 formed therein. The gasket blank is placed between these compression blocks of a mold and the blocks are closed against stops (not shown) with suitable pressure, dwell time, and temperature to densify the body portion of the gasket but leaving the beaded portion 37 of the gasket relatively free of densification. The entire body portion 36 of the gasket is thus densified with the exception of the optional bead portion, which is simultaneously formed by the grooves 45 and 46. The bead, or beads thus formed, are of less density than that of the compacted body portion 36 and such density as the bead 37 acquired in the compression of the gasket structure still depends upon the size and shape of the grooves 45 and 46 in the steel blocks 43 and 44 and the amount of compaction developed in the body portion of the gasket. The density of the beaded portions however, if used, is always at least 10 percent less than the density of the body portion 36 after the body portion has been compacted. Preferably, it is equal to the density of the gasket material prior to compaction and in many instances it is desirable that the density of the bead portion 37 after compaction be less than the density of the gasket material prior to compaction. This is indicated in FIG. 5, where the line 47 represents the free height of the gasket material prior to compaction and in this instance having a density of 70 lbs/ft$^3$., while after compaction the bead 37 has a height diagrammatically indicated at 48 with a density of 51 lbs/ft$^3$ whereas the body portion 36 following compaction, is indicated as having a density of 105 lbs/ft$^3$. Where reference is made herein to the body portion of the finished gasket as having relatively high density and a bead portion as having relatively low density, it is intended that there is at least 10 percent difference in density between these portions.

The step of forming the convolute gasket tube and slicing off the gasket blanks and the step of densification of the gasket body portion and/or forming the bead or beads on the gasket have been described and the next step comprises the optional step of applying a coating material on the gasekt. Gaskets may be formed in accordance with this invention which have their conformability and sealing characteristics supplied in great part by the coating material and have their shape dictated by the type of web material wound on the mandrel 124 to provide a convolute gasket tube from which the gasket blanks may be sliced as desired. The coating thickness can be controlled so that it is possible to more or less tailor the structure of the material to be convoluted to suite a wide variety of specific gasket requirements.

The coating materials provide a coating layer which is impenetrable by fluids with which the gaskets are intended to be used. Where an automotive use is intended the coatings are resistant to environmental fluids, which comprise hydrocarbon and other fluids which may be expected to cause deterioration of conventional gasket materials. A coating is applied to the densified gasket, if desired, and wherein the coating is capable of imparting fluid resistance, thereby making the gasket substantially fluid impermeable as to the clamping surfaces. The coating 16, as shown in FIG. 6, is illustrated as being of similar thickness on the top and bottom surfaces of the gasket 32, including the beaded areas 37, and on the outside edge of the gasket as well as the inside edge surrounding the internal aperture and while the bolt holes 6 are shown as not being coated, the inside edges of these holes may also be coated, if desired. However, while the coating is shown as being of substantially equal thickness on all surfaces the coating may be applied thicker on the aperture edges if preferred. The coating, after application, is at least partially cured or dried. The actual coating operation may be accomplished by means of mop type rollers having deep piles and utilizing procedures and equipment generally known in the art for conveying the gaskets through the coating apparatus, or the coating operation might be accomplished by spraying means or possibly some squeegee method. The partial curing or drying process is utilized so that the coated gasket may be readily handled and further processed.

The material used in this coating process as used in fabricating the present gasket may be developed for firmness, or for softness and is one characterized as having high fluid resistance, by which it is intended that the polymer after total curing, or setting up, is capable of forming a substantially fluid impermeable or impervious barrier. Materials which have been found satisfactory include those that are thermo-setting at temperatures of about 325°–400° F. Satisfactory polymers include blends or synthetic elastomers such as neoprene and nitrile rubber with synthetic resins such as phenolic resin with appropriate curing agents, which may be applied to the gasket as a water or solvent dispersion, after which it may be dried and cured. Where a phenolic resin type polymer is used it will be found that when the coating is cured after drying, the resin softens or melts materially in its combining process with the synthetic rubber and this gives the coating its impermeability. Where a relatively soft coating is utilized, as on a carburetor air horn to bowl gasket, flow of the material into fissures, dents, pores and the like, of mating parts will occur to such extent that a mechanical bond may result so that a release coating of known composition, may be applied over the coatings surfaces and serves somewhat as a lubricant. A release coating that is compatible with the coating 16 is, of course, desirable. The types of polymer materials used as the coating should have the requisite resistance to heat, chemicals, and solvents, in accordance with the environment in which the gaskets are to be used and whether they will be subjected to elevated temperatures. Particular polymers, elastomers and resins selected will be chosen for their respective properties to suit the environmental conditions of particular applications and relative proportions will be varied as dictated by conditions. The coating lends itself to the provision of as thick or as thin a polymer coating as may be necessary for the intented use, but usually the thickness of the polymer layer applied to the surface of the gasket will be about 0.0001–0.005 inch and the preferred thickness will be in the range of about 0.001–0.002 inch.

The specific configuration of the gasket 32 in accordance with this invention may vary according to the use to which the gasket is to be put. Automatic transmission pan gaskets, automotive engine pan gaskets, valve cover gaskets, carburetor air horn to bowl gaskets and similar gaskets may be advantageously made according to the teachings of this invention. The specific outer configuration as well as the number of bolt holes 6 and the shape of the interior aperture or central opening may vary widely and necessarily follow any particular specification.

To summarize: This invention contemplates, first, the formation of a convolutely wound tube from appropriate packing material, then slicing the tube to form individual gasket blanks, and then laterally compacting or densifying the gasket blanks with optional simultaneous forming of an upstanding bead on one or both sides of the gasket structure, or subsequent formation of such bead, with optional subsequent coating of the top and bottom faces of the gasket, or encapsulation of the entire gasket with a suitable sealing coating.

It is preferred that the convolute tube be of the type described in my U.S. Pat. No. 3,697,348, of Oct. 10, 1972, in which discrete uniform layers of coating material are alternated with the substrate packing material as described in the above-identified co-pending application, but in the practice of this invention the convolutely wound tube need not have the discrete interspersed layers, the only requirement being that the packing material after being wound in the convolute form may be subsequently cured at temperatures within the general range of 325° to 400° F.

The reference for forming the convolute tube from precoated packing material as shown in FIG. 1 is that such material may be stored until ready for use, at which time the convolute tube is formed with the application of heat and pressure to produce gasket structures of precise and controllable intercalated layers of barrier material and packing material.

The foregoing disclosure more or less generally describes all of the features of the present invention but cross-reference is had to the co-pending application or patents hereinbefore identified for more fully and specifically disclosed advantages and improvements afforded by the invention.

There has been disclosed a novel gasket structure of convolute construction wherein the body portion of the gasket is laterally densified except for an optional beaded portion which is of less density than the body portion and wherein an optional coating layer may be applied to the gasket structure, to provide greater conformability and minimize clamping forces.

I claim:

1. A method of making a convolutely wound, densified, substantially flat gasket structure having multiple layers of gasket material and a fluid-impermeable polymer material convoluted together about a predetermined convolute axis, said method comprising:
   a. taking a web of compactible gasket material having minute voids therein;
   b. coating the web with a fluid-impermeable, curable polymer;
   c. winding the coated web in convoluted configuration about said axis and with sufficient tension to form a tube about said axis, said tube comprising said web in convoluted form with its coated side forming convoluted fluid-impermeable barriers;

d. cutting said tube transversely of said axis into individual gasket blanks each having a central axis coincident with said tube axis; and e. laterally compacting said blanks in a direction substantially parallel to said central axis to form a transverse bearing surface consisting of multiple plies of gasket material having one or more internal fluid-impermeable barriers, said bearing surface having a flat relatively high density major portion and a minor portion of a relatively low density compactible and conformable bead of gasket material extending in a direction substantially normal to said transverse bearing surface.

2. A method as defined in claim 1 wherein said relatively high density major portion comprises at least 70 percent of the total gasket, said relatively low density portion comprising no more than 30 percent of the gasket.

3. A method as defined in claim 1 including coating the surfaces of said gasket, including said bead, with a unitary and continuous layer of at least partially cured elastomer-resin formed from a thermo-setting mixture of synthetic elastomer and synthetic resin, and curing said coating.

4. A method as defined in claim 1 wherein said gasket structure is laterally compacted to a substantially uniform thickness and density and said bead is disposed in spaced relation to a peripheral edge of the gasket material.

5. A method as defined in claim 1 wherein said bead is densified to a density lesser by a minimum of 10 percent than the density of the relatively high density major portion.

6. The method of making a convolutely wound densified gasket structure characterized by alternate discrete layers of carrier material and a fluid impermeable polymer material convoluted together about a predetermined convolute axis, said method comprising:

a. taking a web of compactible gasket material characterized by minute voids therein, b. coating discretely and uniformly one side of the web with a fluid-impermeable curable polymer material, c. drying the coated web, d. coating discretely and uniformly the other side of the said web with a fluid-impermeable curable polymer material, e. drying the coated web to provide a dimensionally stabilized, substantially adhesion free, coated sheet, f. heating the coated sheet to soften the coatings, g. winding the softened coated sheet in convoluted configuration about said axis and with sufficient tension to form a tube about said axis having the sheet in convoluted form with its coated sides forming convoluted discrete fluid-impermeable barriers of uniform thickness, h. cutting said tube transversely of said axis into individual gasket blanks each having a body portion having an open center having a central axis coincident with said tube axis, an inner margin in circumambient relation about the blank open center and the blank axis, and an outer margin in circumambient relation about the blank and its axis, in which the dimension of the convolutions measured parallel to the axis of the respective blanks is a fraction of the dimension of the blank body portion measured in its plane and normal to the blank axis between the blank outer and inner margins, i. laterally compacting said blanks in a direction substantially parallel to said central axis to form a transverse bearing surface consisting of multiple plies of gasket material having one or more internal fluid-impermeable barriers, said bearing surface having flat relatively high density major portion and a minor portion of a relatively low density compactible and conformable bead of gasket material extending in a direction substantially normal to said transverse bearing surface; and j. curing said fluid-impermeable polymer material.

7. The method of making a convolutely wound densified gasket structure as set forth in claim 1 including the steps k. coating the surfaces of said gasket including said integral bead with a unitary and continuous layer of at least partially cured elastomer-resin formed from a thermo-setting mixture of synthetic elastomer and synthetic resin, and l. curing said coating.

8. The method of making a convolutely wound densified gasket structure as set forth in claim 1 wherein the convolute configuration of the gasket structure is wound to a cross-sectional shape corresponding generally to an interior aperture of the completed gasket.

9. The method of making a convolutely wound densified gasket structure as set forth in claim 1 wherein the gasket structure is compacted to a substantially uniform thickness and density and said bead is disposed in spaced relation to a peripheral edge of the gasket structure.

10. The method of making a convolutely wound densified gasket structure as set forth in claim 1 wherein said bead is formed simultaneously on both sides of the gasket structure.

11. The method of making a convolutely wound densified gasket structure as set forth in claim 1 wherein said bead is densified to a density lesser by a minimum of 10 per cent than the density of the densified gasket structure.

* * * * *